(12) United States Patent
Bae et al.

(10) Patent No.: US 12,365,790 B2
(45) Date of Patent: Jul. 22, 2025

(54) METHOD OF PRODUCING VINYL CHLORIDE-BASED POLYMER COMPOSITE

(71) Applicant: LG CHEM, LTD., Seoul (KR)

(72) Inventors: Heung Kwon Bae, Daejeon (KR); Seong Yong Ahn, Daejeon (KR); Kun Ji Kim, Daejeon (KR); Hyun Kyou Ha, Daejeon (KR); Se Woong Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 617 days.

(21) Appl. No.: 17/780,517

(22) PCT Filed: Jun. 17, 2021

(86) PCT No.: PCT/KR2021/007591
§ 371 (c)(1),
(2) Date: May 26, 2022

(87) PCT Pub. No.: WO2021/256867
PCT Pub. Date: Dec. 23, 2021

(65) Prior Publication Data
US 2022/0411621 A1     Dec. 29, 2022

(30) Foreign Application Priority Data

Jun. 17, 2020 (KR) .................. 10-2020-0073697

(51) Int. Cl.
*C08L 27/06* (2006.01)
*C08F 14/06* (2006.01)
*C08L 1/28* (2006.01)

(52) U.S. Cl.
CPC .............. *C08L 27/06* (2013.01); *C08F 14/06* (2013.01); *C08L 1/284* (2013.01)

(58) Field of Classification Search
None
See application file for complete search history.

(56) References Cited

U.S. PATENT DOCUMENTS

| | | | |
|---|---|---|---|
| 4,145,499 A * | 3/1979 | Nagano | C08F 259/04 526/201 |
| 5,580,931 A | 12/1996 | Aguirre | |
| 11,100,686 B2 | 8/2021 | Yoo et al. | |
| 2016/0311943 A1 | 10/2016 | Youk et al. | |
| 2017/0121438 A1 | 5/2017 | Ju et al. | |
| 2018/0194875 A1 | 7/2018 | Kramer et al. | |

FOREIGN PATENT DOCUMENTS

| | | | | |
|---|---|---|---|---|
| CN | 107056972 A | 8/2017 | | |
| EP | 0191875 A1 * | 8/1986 | ............. | C08F 14/06 |
| GB | 1463737 A | 2/1977 | | |
| JP | S53-137289 A | 11/1978 | | |
| JP | S60-047006 A | 3/1985 | | |
| JP | H09-263601 A | 10/1997 | | |
| JP | H09-509973 A | 10/1997 | | |
| JP | 2004-530755 A | 10/2004 | | |
| JP | 2007-091800 A | 4/2007 | | |
| JP | 2007-238772 A | 9/2007 | | |
| JP | 2019-123887 A | 7/2019 | | |
| KR | 10-1990-0004834 A | 4/1990 | | |
| KR | 10-1991-0009898 B1 | 4/1990 | | |
| KR | 10-1596996 B1 | 2/2016 | | |
| KR | 10-2016-0035439 A | 3/2016 | | |
| KR | 10-2017-0004703 A | 1/2017 | | |
| KR | 10-2018-0034223 A | 4/2018 | | |
| KR | 10-2019-0008186 A | 1/2019 | | |

OTHER PUBLICATIONS

International Search Report (with translation) and Written Opinion dated Sep. 29, 2021, issued in corresponding International Patent Application No. PCT/KR2021/007591.
Extended European Search Report issued in corresponding European Patent Application No. 21827139.3 dated Nov. 22, 2022.

* cited by examiner

*Primary Examiner* — Richard A. Huhn
(74) *Attorney, Agent, or Firm* — Morgan, Lewis & Bockius LLP

(57) ABSTRACT

Provided is a method of producing a vinyl chloride-based polymer composite, which includes: forming particle nuclei by bulk polymerizing vinyl chloride-based monomers; producing a vinyl chloride-based polymer by bulk polymerizing vinyl chloride-based monomers in the presence of the particle nuclei; and producing a vinyl chloride-based polymer composite including the vinyl chloride-based polymer and a cellulose-based compound.

9 Claims, No Drawings

METHOD OF PRODUCING VINYL CHLORIDE-BASED POLYMER COMPOSITE

CROSS-REFERENCE TO RELATED APPLICATION

This application claims priority to and the benefit of Korean Patent Application No. 10-2020-0073697, filed on Jun. 17, 2020, the disclosure of which is incorporated herein by reference in its entirety.

TECHNICAL FIELD

The present invention relates to a method of producing a vinyl chloride-based polymer composite, and more particularly, to a method of producing a vinyl chloride-based polymer composite having improved processability, thermal stability, color characteristics, and transparency.

BACKGROUND ART

Vinyl chloride-based polymers are the most widely used synthetic resins among thermoplastic resins. Polymerization methods of vinyl chloride-based polymers include suspension polymerization, emulsion polymerization, and bulk polymerization. Among these, bulk polymerization does not use a solvent, a dispersant, and an emulsifier, and achieves polymerization by only supplying vinyl chloride monomers, an initiator, and, if necessary, a reaction additive. Polymers polymerized by bulk polymerization are processed into raw materials for chlorinated polyvinyl chloride (PVC), pipes, chassis, shoe insoles, films, and the like and used, and among these, the polymers are widely used for pipes. Bulk polymerization has advantages in that equipment is simple, the reaction is fast, and, since purification processes such as distillation and extraction processes are not carried out, yield is high, a polymer with high purity can be obtained, and the polymer can be handled as is.

However, bulk polymerization has a disadvantage in that it is difficult to control a temperature because a large amount of heat is generated during the polymerization process. Also, in bulk polymerization, since there is no material capable of absorbing and removing the heat of polymerization other than vinyl chloride monomers, and the viscosity of a polymerization material increases as the polymerization proceeds, there is a disadvantage in that it is difficult to diffuse the heat of reaction by conduction or convection. Therefore, in the case of a vinyl chloride-based polymer prepared by bulk polymerization, it is very important to secure the thermal stability of the vinyl chloride-based polymer because the heat of reaction or unexpected heat generation during bulk polymerization may damage the vinyl chloride-based polymer.

Therefore, in order to improve thermal stability during polymerization and/or the thermal stability of a finally prepared vinyl chloride-based polymer/vinyl chloride-based polymer composite, Chinese Laid-Open Patent Application No. 107056972 proposes using a specific type of initiator composition in a pre-polymerization step, Korean Laid-Open Patent Application No. 2016-0035439 proposes a manufacturing method including adding an oxocarboxylic acid, an inorganic phosphate, or an ethylenediaminetetraacetic acid salt during bulk polymerization, and Korean Laid-Open Patent Application No. 2017-0004703 proposes a manufacturing method including copolymerizing with a comonomer having excellent heat resistance. However, the previously proposed methods alone cannot sufficiently improve thermal stability, and there are still limitations in overcoming the low thermal stability problem of bulk polymerization methods.

In addition, when producing a vinyl chloride-based polymer by bulk polymerization, since polymerization water is not used during the reaction, it is very important to improve the flowability of the vinyl chloride polymer after the polymerization is completed. Specifically, in the vinyl chloride-based polymer, since chlorine elements are present in the polymer chains, static electricity is generated when the polymer chains rub against each other. In this case, the free volume of the polymer particles increases due to the generation of static electricity, and due to the increase in volume, it is not easy to pack the prepared polymer, and since it takes a lot of time to transport the packaged polymer, the productivity of a final product is degraded.

In order to improve this, in the past, a method of adding a silicone oil or a nonionic emulsifier after the completion of bulk polymerization was introduced, but a relatively large amount of additives was required to improve the flowability of a vinyl chloride-based polymer, and accordingly, the cost of raw materials increased. In addition, when the required amount is added improve the flowability of the polymer, there may be a problem in that the thermal stability of the vinyl chloride-based polymer and the thermal stability of a composition during processing are not satisfied.

Therefore, there is an urgent need to research a technique of producing a vinyl chloride-based polymer/vinyl chloride-based polymer composite which, in producing a vinyl chloride-based polymer or vinyl chloride-based polymer composite by a bulk polymerization method as such, is capable of significantly improving thermal stability to an equal or higher level as compared to other polymerization methods while improving the flowability of the vinyl chloride-based polymer.

RELATED-ART DOCUMENTS

Patent Documents (Patent Document 1) CN107056972A
(Patent Document 2) KR2016-0035439A
(Patent Document 3) KR2017-0004703A

DISCLOSURE

Technical Problem

The present invention is directed to providing a method of producing a vinyl chloride-based polymer composite, which is capable of providing a vinyl chloride-based polymer composite having excellent flowability, thermal stability, and transparency.

Technical Solution

One aspect of the present invention provides a method of producing a vinyl chloride-based polymer composite, which includes: forming particle nuclei by bulk polymerizing vinyl chloride-based monomers; producing a vinyl chloride-based polymer by bulk polymerizing vinyl chloride-based monomers in the presence of the particle nuclei; and producing a vinyl chloride-based polymer composite including the vinyl chloride-based polymer and a cellulose-based compound.

Advantageous Effects

According to a method of producing a vinyl chloride-based polymer composite of the present invention, the flowability of a vinyl chloride-based polymer composite can be improved because a vinyl chloride-based polymer and a cellulose-based compound are included, and since the transport time of the vinyl chloride-based polymer composite is accordingly shortened, productivity can be increased. In addition, since the generation of static electricity between the vinyl chloride-based polymer chains due to chlorine elements is prevented, the free volume of vinyl chloride-based polymer composite particles can be reduced, and since the distribution time of the vinyl chloride-based polymer such as packaging time and transportation time can be shortened, the productivity of the final product can be improved.

Since the vinyl chloride-based polymer composite of the present invention includes the cellulose-based compound, the vinyl chloride-based polymer can be protected from thermal deformation during post-treatment, and therefore, both thermal stability and transparency can be improved. In addition, since the flowability of the vinyl chloride-based polymer composite is significantly improved, processability can also be significantly improved.

DETAILED DESCRIPTION OF INVENTION

Hereinafter, a more detailed description will be provided to aid the understanding of the present invention.

Terms and words used in this specification and the claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technical spirit of the present invention.

As used herein, the term "polymer" refers to a polymer compound produced by polymerizing monomers of the same or different types. Therefore, the generic term "polymer" encompasses the term "homopolymer," which is commonly used to refer to a polymer formed of only one type of monomer, and the term "copolymer," which refers to a polymer formed of two or more types of monomers.

As used herein, the term "vinyl chloride-based polymer" collectively refers to compounds produced by polymerizing vinyl chloride-based monomers and may refer to polymer chains derived from vinyl chloride-based monomers.

As used herein, the term "vinyl chloride-based polymer composite" may refer to a composite including a vinyl chloride-based polymer and a cellulose-based compound, and specifically, a vinyl chloride-based polymer to which an additive such as a cellulose-based compound is adsorbed. Here, the adsorption may be physical adsorption by the van der Waals force.

In the present invention, the degree of substitution of a compound including a repeating unit represented by Chemical Formula 1 with

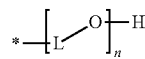

or an alkyl group may be measured by nuclear magnetic resonance analysis.

In the present invention, a viscosity may be measured with a Brookfield viscometer.

Hereinafter, the present invention will be described in detail by way of exemplary embodiments so that those of ordinary skill in the art can easily carry out the present invention. However, the present invention can have various different embodiments and is not limited to the exemplary embodiments described below.

1. Method of Producing Vinyl Chloride-Based Polymer Composite

A method of producing a vinyl chloride-based polymer composite according to one exemplary embodiment of the present invention includes: forming particle nuclei by bulk polymerizing vinyl chloride-based monomers; producing a vinyl chloride-based polymer by bulk polymerizing vinyl chloride-based monomers in the presence of the particle nuclei; and producing a vinyl chloride-based polymer composite including the vinyl chloride-based polymer and a cellulose-based compound.

In the present invention, the cellulose-based compound is used as an antistatic agent and heat stabilizer in order to prevent the vinyl chloride-based polymer from being thermally damaged due to heat applied during post-treatment for removing unreacted vinyl chloride-based monomers and improve the flowability of the vinyl chloride-based polymer.

However, in a suspension polymerization method, a cellulose-based compound is added before the initiation of polymerization or at the beginning of polymerization to help form droplets in a reaction mixture including vinyl chloride-based monomers and thus increases the dispersibility of the vinyl chloride-based monomers and the initial particles of a vinyl chloride-based polymer in a polymerization solvent. Accordingly, the cellulose-based compound prevents the formation of coarse polymer particles by controlling the size and porosity of particles, particularly initial particles, of the polymer being produced, and thereby prevents the degradation of properties such as the viscosity and processability of the polymer. On the other hand, unlike in suspension polymerization, particles are not formed from droplets formed by a dispersing agent or a cellulose-based compound in bulk polymerization, and at the beginning of the reaction when there are few polymer chains, stability can be maintained by due to the electrons of chlorine. In addition, when the polymer chains become long enough to form particles, since the size of the particles is determined by the stirring force, there is no need to use a dispersant and a cellulose-based compound for the purpose of forming droplets.

As described above, the cellulose-based compound added in suspension polymerization is added to increase the dispersibility of vinyl chloride-based monomers and the initial particles of a vinyl chloride-based polymer in a polymerization solvent, whereas, in one exemplary embodiment of the present invention, a cellulose-based compound is added to protect a vinyl chloride-based polymer from heat applied during post-treatment carried out after bulk polymerization and improve the flowability of the polymer which may be degraded due to the absence of a polymerization solvent. Therefore, there is a difference in the purpose of adding a cellulose-based compound.

In the present invention, it is preferable that the cellulose-based compound is a compound having a high degree of substitution with an alkyl group to be easily adsorbed to the vinyl chloride-based polymer and having a high degree of substitution with

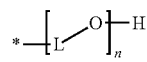

(L is a $C_1$-$C_{10}$ alkylene group, and n is 1 to 100) to facilitate its antistatic role. However, when the degree of substitution with an alkyl group and

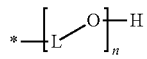

is excessive, the gelation temperature of the cellulose-based compound may be lowered, and in this case, in a thermal treatment process for removing unreacted vinyl chloride-based monomers, gelation may proceed rapidly, forming lumps, so it is necessary to appropriately adjust the composition of substituents in the cellulose-based compound and the content of the cellulose-based compound.

Accordingly, the vinyl chloride-based polymer composite may include 100 parts by weight of the vinyl chloride-based polymer and 0.003 to 0.550 parts by weight of the cellulose-based compound, preferably, 100 parts by weight of the vinyl chloride-based polymer and 0.005 to 0.500 parts by weight of the cellulose-based compound, and more preferably, 100 parts by weight of the vinyl chloride-based polymer and 0.15 to 0.5 parts by weight of the cellulose-based compound. When the above-described range is satisfied, the flowability, thermal stability, transparency, and color characteristics of the vinyl chloride-based polymer composite can be improved. When a smaller amount of cellulose-based compound is included, an effect of improving flowability may be insignificant. When an excessive amount of cellulose-based compound is included, a phenomenon in which the vinyl chloride-based polymer forms a lump (lumping phenomenon) may occur due to high viscosity and high adsorption characteristics (tendency to adsorb to other materials) which are inherent to the cellulose-based compound. As a result, since an excessive amount of vinyl chloride-based polymer composite having an abnormal size is produced, the flowability, thermal stability, and transparency of the vinyl chloride-based polymer composite may be lowered.

Meanwhile, a vinyl chloride-based polymer composite having a normal size may refer to a vinyl chloride-based polymer composite capable of passing through a screen mesh having a mesh size of 30 to 40 and specifically 35. When the vinyl chloride-based polymer passing through the above-described screen mesh accounts for 95 wt % or more, production yield is excellent, and when the vinyl chloride-based polymer passing through the above-described screen mesh accounts for less than 90 wt %, production yield is very low, and thus, industrial applicability may be very low.

The cellulose-based compound according to one exemplary embodiment of the present invention may include one or more selected from the group consisting of cellulosic biomass and a compound including a repeating unit represented by the following Chemical Formula 1:

<Chemical Formula 1>

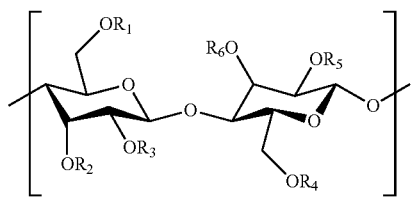

In Chemical Formula 1, $R_1$ to $R_6$ are each independently hydrogen, a $C_1$-$C_{10}$ alkyl group, or

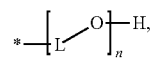

and L is a $C_1$-$C_{10}$ alkylene group.

The cellulosic biomass may include one or more types of cellulose selected from the group consisting of fiber-based cellulose, lignin-based cellulose, and seaweed-based cellulose.

In the above Chemical Formula 1, $R_1$ to $R_6$ may each be independently hydrogen, a $C_1$-$C_4$ alkyl group, or

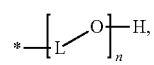

and L may be a $C_1$-$C_4$ alkylene group, and preferably, $R_1$ to $R_6$ are each independently hydrogen, a $C_1$-$C_2$ alkyl group, or

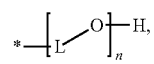

and L is a $C_1$-$C_3$ alkylene group.

The degree of substitution of the compound including the repeating unit represented by the above Chemical Formula 1 with

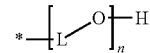

may be 3 to 20 mol %, preferably 5 to 15 mol %, and more preferably 7 to 9 mol %. When the above-described condition is satisfied, a significant decrease in the gelation temperature of the vinyl chloride-based polymer composite can be prevented, and at the same time, the cellulose-based compound can be easily adsorbed to the vinyl chloride-based polymer.

The degree of substitution of the compound including the repeating unit represented by the above Chemical Formula 1 with the alkyl group may be 15 to 40 mol %, preferably 20 to 35 mol %, and more preferably 27 to 29 mol %. When the above-described condition is satisfied, since a significant decrease in the gelation temperature of the vinyl chloride-based polymer composite can be prevented, and at the same time, an antistatic function can be easily achieved, the flowability of the vinyl chloride-based polymer composite can be improved.

Meanwhile, the cellulose-based compound as a 2 wt % aqueous solution may have a viscosity of 0.010 to 20.000 Pa·s, preferably 0.12 to 0.220 Pa·s, and more preferably 0.181 Pa·s at 20° C. When the above-described range is satisfied, since the viscosity of the cellulose-based compound may be an appropriate viscosity for forming a vinyl chloride-based polymer composite, dispersibility in the vinyl chloride-based polymer base material can be further increased, and accordingly, the transparency and flowability of the vinyl chloride-based polymer composite can be further improved. In addition, when the above-described viscosity range is satisfied, the enlargement of vinyl chloride-based polymer particles due to the inherent viscosity and adsorption characteristics of the cellulose-based compound and the phenomenon in which the polymer forms a lump (lumping phenomenon) can be more effectively inhibited, and therefore, there are advantages of further improving the quality of the produced vinyl chloride-based polymer, such as thermal stability and transparency, and inhibiting the formation of scale in a polymerization reactor.

The cellulose-based compound may be added as a solid cellulose-based compound or may be added in an aqueous solution state by being mixed with a water solvent, but is preferably added in the form of an aqueous solution so that it can be uniformly dispersed in the vinyl chloride-based polymer composite. In this case, the aqueous solution may include the cellulose-based compound at 1 to 10 wt %, preferably 1 to 7 wt %, and more preferably 3 to 5 wt %. When the cellulose-based compound is added, in an aqueous solution state, in the above-described amount, since the cellulose-based compound can be more uniformly dispersed in the vinyl chloride-based polymer composite, the thermal stability, flowability, and transparency of the vinyl chloride-based polymer composite, which is the final product, can be further improved.

Meanwhile, the step of producing a vinyl chloride-based polymer composite may additionally include a step of carrying out thermal treatment to remove unreacted vinyl chloride-based monomers after the step of producing a vinyl chloride-based polymer composite.

The thermal treatment condition may be a vacuum condition and specifically −0.2 kgf/cm$^2$ to −0.8 kgf/cm$^2$ at a temperature of 70 to 90° C.

Meanwhile, when the step of forming particle nuclei is carried out, the production yield of the vinyl chloride-based polymer can be significantly increased.

The step of forming particle nuclei and the step of producing a vinyl chloride-based polymer may be carried out in the presence of an initiator. The initiator present in the step of producing a vinyl chloride-based polymer may be the residual initiator of the step of forming particle nuclei.

The initiator may be one or more selected from the group consisting of dicumyl peroxide, dipentyl peroxide, di(3,5,5-trismethylhexanoyl)peroxide, dilauroyl peroxide, diisopropyl peroxydicarbonate, di-sec-butyl peroxydicarbonate, di(2-ethylhexyl)peroxydicarbonate, t-butyl peroxyneodecanoate, t-butyl peroxyneoheptanoate, t-amyl peroxyneodecanoate, cumyl peroxyneodecanoate, cumyl peroxyneoheptanoate, 1,1,3,3-tetramethylbutyl peroxyneodecanoate, azobis-2,4-dimethylvaleronitrile, potassium persulfate, and ammonium persulfate.

The vinyl chloride-based monomers of the step of forming particle nuclei and the step of producing a vinyl chloride-based polymer may be the same or different and may each be independently a pure vinyl chloride monomer or a mixed monomer which is mainly based on the pure vinyl chloride monomer and includes vinyl-based monomers copolymerizable with the pure vinyl chloride monomer. The mixed monomer may include 1 to 50 parts by weight of the vinyl-based monomer based on 100 parts by weight of the vinyl chloride monomer. The vinyl-based monomer may be one or more selected from the group consisting of: an olefin compound such as ethylene or propylene; a vinyl ester such as vinyl acetate or vinyl propionate; an unsaturated nitrile such as acrylonitrile; a vinyl alkyl ether such as vinyl methyl ether or vinyl ethyl ether; an unsaturated fatty acid such as acrylic acid, methacrylic acid, itaconic acid, or maleic acid; and an anhydride of the fatty acid.

In the step of forming particle nuclei, the initiator may be included at 0.01 to 0.20 parts by weight, specifically 0.03 to 0.15 parts by weight, and more specifically 0.05 to 0.10 parts by weight based on 100 parts by weight of the vinyl chloride-based monomer. When the above-described range is satisfied, the stability of the polymerization process can be improved.

In the step of producing a vinyl chloride-based polymer, the initiator may be included at 0.03 to 0.60 parts by weight, specifically 0.05 to 0.40 parts by weight, and more specifically 0.08 to 0.30 parts by weight based on 100 parts by weight of the sum of the particle nuclei, the vinyl chloride-based monomers unreacted in the step of forming particle nuclei and the vinyl chloride-based monomers added in the step of producing a vinyl chloride-based polymer. When the above-described range is satisfied, the stability of the polymerization process can be improved.

The bulk polymerization of the step of forming particle nuclei may be carried out at a temperature of 60 to 80° C. and a pressure of 9 to 14 kgf/cm$^2$. When the above-described conditions are satisfied, the particle nuclei can be formed from the vinyl chloride-based monomers. When a polymerization conversion rate is in the range of 10% to 15%, the bulk polymerization can be terminated.

The bulk polymerization of the step of producing a vinyl chloride-based polymer may be carried out at a temperature of 50 to 70° C. and a pressure of 7 to 12 kgf/cm$^2$. When the above-described conditions are satisfied, the particle nuclei can be grown to form a vinyl chloride-based polymer.

The step of producing a vinyl chloride-based polymer may be a step of bulk polymerizing the vinyl chloride-based polymer and then recovering unreacted vinyl chloride-based monomers under vacuum conditions and producing a vinyl chloride-based polymer. The recovery process may be performed under any conditions under which recovery is typically performed, for example, at room temperature (20±5° C.) and vacuum conditions.

In the step of producing a vinyl chloride-based polymer, when a polymerization conversion rate of 50 to 70% is reached, the bulk polymerization can be terminated, and a reaction terminator may be added to terminate the bulk polymerization.

The reaction terminator is a material capable of terminating a reaction by causing the initiator to lose its function, and the reaction terminator may be one or more selected from the group consisting of a phenol compound, an amine compound, a nitrile compound, and a sulfur compound. The phenol compound may be one or more selected from the group consisting of triethylene glycol bis-3-(3-t-butyl-4-hydroxy-5-methylphenyl)propionate, hydroquinone, p-methoxyphenol, t-butyl-4-hydroxyanisol, n-octadecyl-3-(4-hydroxy-3,5-di-t-butylphenyl)propionate, 2,5-di-t-butyl-hydroquinone, 4,4'-butylidene bis(3-methyl-6-t-butyl phenol), t-butylcatechol, 4,4-thiobis(6-t-butyl-m-cresol), and a tocopherol. The amine compound may be one or more selected from the group consisting of N,N-diphenyl-p-phenylenediamine and 4,4-bis(dimethylbenzyl)diphenyl. The nitrile compound may be 4-hydroxy-2,2,6,6-tetramethyl-piperidin-1-oxyl. The sulfur compound may be one or more selected from the group consisting of dodecyl mercaptan and 1,2-biphenyl-2-thiol.

When adding the reaction terminator, an additive such as an antioxidant may be added as needed. The antioxidant may be added for the purpose of making the color of the vinyl chloride-based polymer white.

Hereinafter, exemplary embodiments are presented to aid in the understanding of the present invention, but the embodiments are merely illustrative of the present description, and it will be apparent to those skilled in the art that various changes and modifications are possible within the scope and technical spirit of the present description and such variations and modifications are included within the scope of the appended claims.

EXAMPLES AND COMPARATIVE EXAMPLES

Examples 1 to 9 and Comparative Examples 1 to 3

To a prepolymerization reactor (volume: 0.2 m$^3$) degassed to high vacuum, 140 kg of vinyl chloride monomers and 85 g of t-butylperoxyneodecanoate as an initiator were sequentially added. Subsequently, the pressure of the prepolymerization reactor was increased to 12 kgf/cm$^2$, and bulk polymerization was carried out, thus producing a mixture including particle nuclei. In this case, a polymerization conversion rate was 10%.

To a main polymerization reactor (volume: 0.5 m$^3$), 80 kg of vinyl chloride monomers, the entire amount of the above-described mixture, and 200 g of 1,1,3,3-tetramethyl butylperoxyneodecanoate as an initiator were sequentially added and stirred. While continuing stirring and maintaining the pressure of the main polymerization reactor at 7.5 kgf/cm$^2$, bulk polymerization was carried out for 200 minutes, and a polymerization conversion rate of 60% was reached.

Subsequently, after sequentially adding 15 g of 4-hydroxy-2,2,6,6-tetramethyl-piperidin-1-oxyl as an antioxidant and 100 g of triethylene glycol bis(3-t-butyl-4-hydroxy-5-methylphenyl)propionate to the main polymerization reactor, unreacted vinyl chloride monomers were recovered under vacuum while maintaining stirring. Subsequently, while maintaining stirring, an antistatic agent was added in the amounts shown in Tables 1 and 2 below to the main polymerization reactor or not added, and then thermal treatment was carried out at 80° C., and thus a vinyl chloride polymer composite was obtained.

Experimental Example 1: Evaluation of Flowability

The vinyl chloride-based polymer composites of Examples and Comparative Examples were input in a sieve (diameter: 20 cm, wire thickness: 224 μm, 45 mesh), and using a sieve vibrator (HAVER EML 200 digital plus manufactured by HAVER & BOECKER OHG; set at an amplitude of 0.5), the time (in seconds) taken until no vinyl chloride-based polymer composite remained in the sieve was measured, and the results are shown in Tables 1 and 2 below. When the time taken until no vinyl chloride-based polymer composite remained in the sieve is shorter, it means that flowability is better.

Experimental Example 2: Evaluation of Thermal Stability 100 parts by weight of each of the vinyl chloride-based polymer composites of Examples and Comparative Examples, 4 parts by weight of a mono, dimethyltin mercaptide complex (SONGSTAB™ MT-800 manufactured by SONGWON) as a stabilizer, 1 part by weight of a processing aid (PA912 manufactured by LG Chem), and 6 parts by weight of an impact modifier (MB802 manufactured by LG Chem) were mixed, kneaded at 185° C. for three minutes using a roll-mill, and subsequently formed into a preliminary sheet (thickness: 0.5 mm). After cutting the preliminary sheet to a predetermined size, a plurality of the preliminary sheets were overlapped so that the total weight was 45 g, placed in a mold having a thickness of 3 mm, and then, using a press, preheated at 185° C. for two minutes, heated at low pressure for three minutes, and cooled at high pressure for two minutes, and thus a sheet having a thickness of 3 mm was obtained. A white index value of Sheet 1 was measured using a colorimeter (NR-3000 manufactured by Nippon Densoku Co., Ltd.), and the results are shown in Tables 1 and 2. Higher white index values mean better thermal stability.

TABLE 1

| Classification | | Comparative Example 1 | Example 1 | Example 2 | Example 3 | Example 4 | Example 5 |
|---|---|---|---|---|---|---|---|
| Antistatic agent (g) | Addition time | Not added | After PVC production | After PVC production | After PVC production | After PVC production | After PVC production |
| | HPMC 1 | 0 | 6.6 | 33 | 396 | 660 | 726 |
| Amount of antistatic agent based on 100 parts by weight of PVC (parts by weight) | | 0 | Approx. 0.005 | 0.025 | 0.3 | 0.5 | 0.55 |
| PVCC | Flowability | <600 | 6 | 5 | 6 | 6 | 9 |
| Sheet | White index | 64 | 64 | 64 | 64 | 64 | 62 |

HPMC 1: Hydroxypropyl methylcellulose having a methoxy substitution degree of 27.99 mol %, a hydroxypropyl group substitution degree of 7.95 mol %, and a viscosity of 0.181 Pa.s (MECELLOSE ® FMC60150 manufactured by Lotte Fine Chem)
VCM: vinyl chloride monomer
PVC: polyvinyl chloride polymer
PVCC: vinyl chloride polymer composite

TABLE 2

| Classification | | Example 6 | Example 7 | Example 8 | Example 9 | Comparative Example 2 | Comparative Example 3 |
|---|---|---|---|---|---|---|---|
| Antistatic agent (g) | Addition time | After PVC production | After PVC production | After PVC production | After PVC production | After PVC production | After PVC production |
| | HPMC 2 | 33 | 0 | 0 | 0 | 0 | 0 |
| | HPMC 3 | 0 | 33 | 0 | 0 | 0 | 0 |
| | HPMC 4 | 0 | 0 | 33 | 0 | 0 | 0 |

TABLE 2-continued

| Classification | | Example 6 | Example 7 | Example 8 | Example 9 | Comparative Example 2 | Comparative Example 3 |
|---|---|---|---|---|---|---|---|
| | HPMC 5 | 0 | 0 | 0 | 33 | 0 | 0 |
| | SO | 0 | 0 | 0 | 0 | 33 | 0 |
| | JP05 | 0 | 0 | 0 | 0 | 0 | 33 |
| Amount of antistatic agent based on 100 parts by weight of PVC (parts by weight) | | 0.025 | 0.025 | 0.025 | 0.025 | 0.025 | 0.025 |
| PVCC Sheet | Flowability | 8 | 6 | 9 | 6 | 30 | 120 |
| | White index | 64 | 64 | 64 | 64 | 64 | 60 |

HMPC 2: Hydroxypropyl methylcellulose having a methoxy substitution degree of 23.6 mol %, a hydroxypropyl group substitution degree of 8.4 mol %, and a viscosity of 0.08 to 0.12 Pa.s (MECELLOSE ® PMC-10M manufactured by Lotte Fine Chem)
HMPC 3: Hydroxypropyl methylcellulose having a methoxy substitution degree of 28 to 30 mol %, a hydroxypropyl group substitution degree of 7 to 12 mol %, and a viscosity of 0.08 to 0.12 Pa.s (60SH manufactured by Shin-Etsu)
HMPC 4: Hydroxypropyl methylcellulose having a methoxy substitution degree of 27 to 30 mol %, a hydroxypropyl group substitution degree of 4 to 7.5 mol %, and a viscosity of 0.08 to 0.012 Pa.s (65SH manufactured by Shin-Etsu)
HMPC 5: Hydroxypropyl methylcellulose having a methoxy substitution degree of 19 to 24 mol %, a hydroxypropyl group substitution degree of 4 to 12 mol %, and a viscosity of 0.2 to 0.3 Pa.s (90SH manufactured by Shin-Etsu)
SO: Silicone oil (DC 200 manufactured by Dow Corning)
JP05: Dispersant (polyvinyl alcohol (PVA) dispersant manufactured by JVP)
PVC: polyvinyl chloride polymer
PVCC: polyvinyl chloride polymer composite Referring to Tables 1 and 2, in the case of the vinyl chloride polymer composites of Examples 1 to 9 in which HPMC 1, HPMC 2, HPMC 3, HPMC 4, or HPMC 5 was used as an antistatic agent, it can be seen that both flowability and white index were high. On the other hand, in the case of Comparative Example 1 which did not include an antistatic agent, Comparative Example 2 which included a silicone oil as an antistatic agent, and Comparative Example 3 which included a PVA dispersant as an antistatic agent, flowability was lowered, and in the case of Comparative Example 3, white index was also reduced.

The invention claimed is:

1. A method of producing a vinyl chloride-based polymer composite, comprising:
   forming particle nuclei by a bulk polymerizing vinyl chloride-based monomers;
   producing a vinyl chloride-based polymer by a bulk polymerizing vinyl chloride-based monomers in the presence of the particle nuclei; and
   producing the vinyl chloride-based polymer composite including the vinyl chloride-based polymer and a cellulose-based compound,
   wherein the vinyl chloride-based polymer composite includes:
   100 parts by weight of the vinyl chloride-based polymer; and
   0.003 parts by weight to 0.550 parts by weight of the cellulose-based compound.

2. The method of producing a vinyl chloride-based polymer composite of claim 1, further comprising, after the producing of the vinyl chloride-based polymer composite, carrying out a thermal treatment of the vinyl chloride-based polymer composite.

3. The method of producing a vinyl chloride-based polymer composite of claim 1, wherein the cellulose-based compound as a 2 wt % aqueous solution has a viscosity of 0.01 Pa·s to 20 Pa·s at 20° C.

4. The method of producing a vinyl chloride-based polymer composite of claim 1, wherein the cellulose-based compound includes one or more selected from the group consisting of cellulosic biomass and a compound including a repeating unit represented by the following Chemical Formula 1:

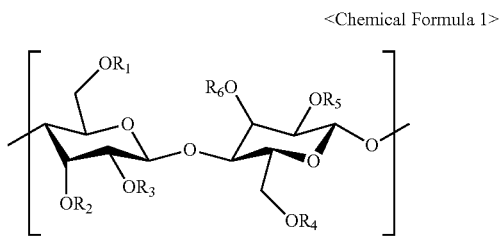

<Chemical Formula 1> wherein, in the above Chemical Formula 1,
$R_1$ to $R_6$ are each independently hydrogen, a $C_1$-$C_{10}$ alkyl group, or

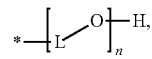

wherein,
L is a $C_1$-$C_{10}$ alkylene group, and
n is an integer in a range of 1 to 100.

5. The method of producing a vinyl chloride-based polymer composite of claim 4, the cellulosic biomass includes one or more selected from the group consisting of fiber-based cellulose, lignum-based cellulose, and seaweed-based cellulose.

6. The method of producing a vinyl chloride-based polymer composite of claim 4, wherein a degree of substitution of the compound including the repeating unit represented by the above Chemical Formula 1 with the

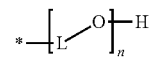

is in a range of 3 mol % to 20 mol %.

7. The method of producing a vinyl chloride-based polymer composite of claim 4, wherein a degree of substitution of the compound including the repeating unit represented by the above Chemical Formula 1 with the $C_1$-$C_{10}$ alkyl group is in a range of 15 mol % to 40 mol %.

8. The method of producing a vinyl chloride-based polymer composite of claim 4, wherein the compound including the repeating unit represented by the above Chemical Formula 1 is one or more selected from the group consisting of methylcellulose, hydroxyethyl methylcellulose, hydroxypropyl methylcellulose, and hydroxybutyl methylcellulose.

9. The method of producing a vinyl chloride-based polymer composite of claim 1, wherein the vinyl chloride-based polymer composite is the vinyl chloride-based polymer to which the cellulose-based compound is adsorbed.

* * * * *